United States Patent [19]
Busby et al.

[11] Patent Number: 6,056,307
[45] Date of Patent: *May 2, 2000

[54] BICYCLE ANTI-DIVE BRAKING SYSTEM

[76] Inventors: James S. Busby, 247 Knox St.;
Michael Webb, 139 Albert Pl., both of
Costa Mesa, Calif. 92627

[*] Notice: This patent is subject to a terminal disclaimer.

[21] Appl. No.: 09/233,672

[22] Filed: Jan. 19, 1999

Related U.S. Application Data

[63] Continuation of application No. 08/707,670, Sep. 4, 1996, Pat. No. 5,901,974.

[51] Int. Cl.⁷ .................................................. B62K 25/26
[52] U.S. Cl. ......................... 280/284; 188/24.14; 188/26; 280/285
[58] Field of Search .................................. 280/275, 284, 280/283, 285, 288, 124.102; 180/227; 188/24.14, 26, 24.11, 71.1

[56] References Cited

U.S. PATENT DOCUMENTS

| | | |
|---|---|---|
| 439,095 | 10/1890 | Becker . |
| 578,615 | 3/1897 | Travis . |
| 606,323 | 6/1898 | Wronski . |
| 657,667 | 9/1900 | Mills . |
| 944,795 | 12/1909 | Leet et al. . |
| 1,047,430 | 12/1912 | Michaelson . |
| 1,130,828 | 3/1915 | Kuehn . |
| 1,257,751 | 2/1918 | Strand . |
| 1,298,958 | 4/1919 | Johnston . |
| 1,412,012 | 4/1922 | Bruno . |

(List continued on next page.)

FOREIGN PATENT DOCUMENTS

| | | | |
|---|---|---|---|
| 155582 | 3/1954 | Australia . | |
| 923235 | 7/1947 | France . | |
| 2395879 | 3/1979 | France . | |
| 3033294 | 4/1981 | Germany | 280/285 |
| 421518 | of 1947 | Italy . | |
| 423515 | of 1947 | Italy . | |
| 428442 | 12/1947 | Italy | 280/285 |
| 540821 | of 1956 | Italy . | |
| 5105168 | 4/1995 | Japan . | |
| 24918 | of 0000 | United Kingdom | 280/284 |
| 17336 | 10/1913 | United Kingdom . | |
| 15332 | 9/1916 | United Kingdom . | |
| 220760 | 8/1924 | United Kingdom . | |
| PCT/GB92/ 00397 | 9/1992 | WIPO . | |
| PCT/US93/ 00502 | 7/1993 | WIPO . | |

OTHER PUBLICATIONS

1992 Cannondale Spec—Suspension Mountain Bicycles—Article—10 pgs.
Trek 9000 Series Spec+ "This Beauty Is A Beast"–Article—8 pgs.
Fisher RS–1—Article–4 pgs.—Mountain Bike Action/Mar. '92.
Suspension Mania Strikes Cycling—3 pgs. Mountain Bike Action/Feb. '92.
Boulder Intrepid AL—2 pgs.—Mountain Bike Action/Mar. '92.

(List continued on next page.)

*Primary Examiner*—Anne Marie Boehler
*Attorney, Agent, or Firm*—Kit M. Stetina; Stetina Brunda Garred & Brucker

[57] ABSTRACT

A bicycle braking system comprising a bicycle frame having a rear wheel suspension mechanism connected thereto. Rotatably connected to the rear wheel suspension mechanism is the rear wheel axle of the bicycle rear wheel which includes a braking surface. Connected to the rear wheel suspension mechanism is a braking assembly which is selectively engageable to the braking surface of the rear wheel. The braking assembly is configured such that the engagement thereof to the braking surface facilitates the transfer of braking force to and the actuation of the rear wheel suspension mechanism in a manner countering the unweighting thereof normally resulting from the braking of the bicycle.

10 Claims, 3 Drawing Sheets

U.S. PATENT DOCUMENTS

| | | |
|---|---|---|
| 1,594,079 | 7/1926 | Tanner . |
| 2,132,317 | 10/1938 | Pease ........................................ 280/284 |
| 2,283,671 | 5/1942 | Finlay et al. ............................. 280/284 |
| 2,446,731 | 8/1948 | Wheler ..................................... 280/284 |
| 3,917,313 | 11/1975 | Smith et al. ............................. 280/284 |
| 3,942,821 | 3/1976 | Bock ........................................ 280/277 |
| 3,948,543 | 4/1976 | MacDonald et al. .................... 280/284 |
| 4,039,200 | 8/1977 | McGonegle .............................. 280/284 |
| 4,046,396 | 9/1977 | Morrison Taylor ................. 280/281 R |
| 4,058,181 | 11/1977 | Buell ......................................... 180/32 |
| 4,186,936 | 2/1980 | Offenstadt et al. ...................... 280/277 |
| 4,322,088 | 3/1982 | Miyakoshi et al. ...................... 280/284 |
| 4,421,337 | 12/1983 | Pratt ......................................... 280/277 |
| 4,433,850 | 2/1984 | Miyakoski et al. ...................... 280/277 |
| 4,506,755 | 3/1985 | Tsuchida et al. ........................ 180/227 |
| 4,529,056 | 7/1985 | Kreuz ....................................... 180/227 |
| 4,568,101 | 2/1986 | Bleustein et al. ........................ 280/707 |
| 4,673,053 | 6/1987 | Tanaka et al. ........................... 180/227 |
| 4,679,811 | 7/1987 | Shuler ...................................... 280/284 |
| 4,732,404 | 3/1988 | Coetzee ................................... 280/283 |
| 4,789,174 | 12/1988 | Lawwill ................................... 280/284 |
| 4,792,150 | 12/1988 | Groendal ................................. 280/275 |
| 4,815,763 | 3/1989 | Hartmann ................................ 280/276 |
| 4,951,791 | 8/1990 | Belil Creixell ......................... 180/219 |
| 4,997,197 | 3/1991 | Shultz ...................................... 280/275 |
| 5,000,470 | 3/1991 | Kamler et al. ........................... 280/275 |
| 5,014,808 | 5/1991 | Savard et al. ............................ 180/219 |
| 5,098,114 | 3/1992 | Jones ....................................... 280/284 |
| 5,121,937 | 6/1992 | Lawwill ................................... 280/284 |
| 5,205,572 | 4/1993 | Buell et al. .............................. 280/284 |
| 5,226,674 | 7/1993 | Buell et al. .............................. 280/284 |
| 5,240,269 | 8/1993 | Kerr ......................................... 280/285 |
| 5,244,224 | 9/1993 | Busby ...................................... 280/284 |
| 5,259,637 | 11/1993 | Busby ...................................... 280/284 |
| 5,284,354 | 2/1994 | McWethy ................................ 280/284 |
| 5,295,702 | 3/1994 | Buell ........................................ 280/284 |
| 5,306,036 | 4/1994 | Busby ...................................... 280/284 |
| 5,332,246 | 7/1994 | Buell ........................................ 280/284 |
| 5,354,085 | 10/1994 | Gally ....................................... 280/285 |
| 5,370,411 | 12/1994 | Takamiya et al. ....................... 280/284 |
| 5,441,292 | 8/1995 | Busby ...................................... 280/284 |
| 5,553,881 | 9/1996 | Klassen et al. .......................... 280/284 |

OTHER PUBLICATIONS

Team Shockblok—6 pgs.—Mountain Bike Action.Jul. '92.

Mountain Bike Action, Oct. 1992, pps. 10, 25–26, 28–29, 31, 36–37, 39–41, 44–45, 47, 58, 70, 73, 76, 79, 123, and 130.

Bicycling, May, 1992, pps. 26–27, 58, 63–64, and 105.

Mountain Biking, Nov. 1992, vol. 6, No. 11, pps. 6–9, 25–31, 48–49, 65, 71, 73, 108–109, 115, 124, 129, 140, 143, 163, and 169.

Mountain Biking, Dec. '92, pps. 1–2, 5, 18, 19, 44–49, 77 127, and 160.

Mountain Biking, Jan. '93, vol. 7, No. 1, pps. 32–33, 40, 45, 71, 75 82–83, 115, and 117.

Welcome to the Next Generation . . . —9 pgs.—Mountain Action Bike—Jun. '92.

Schwinn S.A.S.S.—7 pgs.—Mountain Bike Action—May '92.

Offroad Pro–Flex 500—3 pgs. —Offroad.

——"Litespeed Suspension", Mountain Bike–Action, 1 pg . . . May '92.

Slingshot—Mountain & City Biking, 6 pgs.

Guide to Suspension and High Performance, vol. 3, 1992, pp. 9, 13–15; 17, 30–31, 36–37, 42–45, 47, 53, 60, 69, 71, 76, 85–87, 92, 96, 98, 100, 108–112, 117, and 119.

"AMP Mongoose", Mountain Bike Action, Jul. 1992, pp. 47–48, 50–51, 54.

"Schwinn Buell", Guide To Suspension, vol. 3, 1992, 4 pages.

"Yeti–Lawwill DH: The Bike That Mert Built" Mountain Biking, vol. 10, No. 9, Sep. 1996, 64–70 (pages).

"Yeti Downhill Bike", Mountain Bike, Sep. 1996, vol. 12, No. 8, pp. 71–75.

"San Andreas Report Card—Peccadillos, Peculiarties & Traits", Mountain Bike Action, Dec. 1992, pp. 80–81.

"Buyer's Guide", Mountain Bike Action, May 1993, pp. 108 & 110.

BICYCLE ANTI-DIVE BRAKING SYSTEM

This is a Continuation of U.S. application Ser. No. 08/707,670, filed Sep. 4, 1996, now U.S. Pat. No. 5,901,974.

FIELD OF THE INVENTION

The present invention relates generally to bicycles, and more particularly to a bicycle braking system which is specifically adapted to counter the unweighting (i.e., "dive") of the rear wheel suspension mechanism of the bicycle normally induced by the weight transfer resulting from the braking of the bicycle.

BACKGROUND OF THE INVENTION

It is well known that the braking of a bicycle results in the unweighting (i.e., "dive") of the rear wheel suspension thereof. Such "dive" is most apparent when a braking force is applied to the front wheel of the bicycle, particularly when traveling at high speeds. Indeed, a sudden application of braking force to the front wheel of the bicycle often results in a dive which is so excessive that the entire rear wheel of the bicycle is lifted off of the ground, often times causing the rider to be flipped over the handle bars of the bicycle. The dive effect also occurs when a braking force is applied to the rear wheel of the bicycle, though the effect is not as pronounced as when a braking force is applied solely to the front wheel.

In the prior art, there has been developed numerous bicycles which incorporate a rear wheel suspension mechanism possessing shock absorbing capability for enhancing the ride, comfort and performance of the bicycle. In these types of bicycles, the application of a braking force to the rear wheel results in the unweighting or dive of the rear wheel suspension mechanism which, as previously indicated, is induced by the weight transfer resulting from the braking of the bicycle. In those bicycles incorporating shock absorbing rear wheel suspension mechanisms, the dive effect is more pronounced due to the loosening of the rear suspension mechanism attributable to the unweighting thereof. As will be recognized, the overall performance characteristics of the bicycle would be substantially enhanced if the dive effect could be completely or substantially eliminated during the application of a braking force to the rear wheel.

Applicant has found that the unweighting or dive of the rear wheel suspension mechanism of a bicycle may be countered by transferring the braking force/energy applied to the rear wheel directly to the rear wheel suspension mechanism so a to facilitate the actuation thereof. In this respect, the actuation of the rear wheel suspension mechanism, and more particularly its shock absorber, causes the braking force/energy to be absorbed thereby, thus countering the dive effect. To facilitate such force/energy transfer, Applicant has developed a bicycle braking system which is separate from but connected to the rear wheel suspension mechanism. The braking system is selectively engageable to a braking surface of the rear wheel, and is configured such that the engagement thereof to the braking surface facilitates the transfer of braking force to and the actuation of the rear wheel suspension mechanism in a manner countering the unweighting thereof normally resulting from the braking of the bicycle. Importantly, the present bicycle braking system may be selectively tuned such that the anti-dive effect facilitated thereby is weaker, equal to, or stronger than the dive induced by weight transfer during bicycle braking.

SUMMARY OF THE INVENTION

In accordance with the present invention, there is provided a bicycle braking system which is adapted to transfer braking force/energy to the rear wheel suspension mechanism of the bicycle for creating an anti-dive effect. The bicycle braking system of the present invention comprises a bicycle frame having a rear wheel suspension mechanism connected thereto. Rotatably connected to the rear wheel suspension mechanism is the rear wheel axle of the bicycle rear wheel which includes a braking surface. Pivotally connected to the rear wheel suspension mechanism is a caliper arm, while attached to the caliper arm is a brake caliper which is selectively engageable to the braking surface.

The braking system of the present invention further comprises a pull link having a first end which is pivotally connected to the caliper arm and a second end which is pivotally connected to the rear wheel suspension mechanism. The engagement of the brake caliper to the braking surface induces the pivotal movement of the caliper arm which facilitates the transfer of braking force to and the actuation of the rear wheel suspension mechanism in a manner countering the unweighting thereof normally resulting from the braking of the bicycle. In this respect, the frictional force exerted on the brake caliper when the same engages the braking surface in combination with the rotational movement of the brake caliper/caliper arm is a source of braking force/energy which is introduced into the rear wheel suspension mechanism to facilitate the actuation thereof.

In the present invention, the braking surface of the rear wheel is preferably defined by a circularly configured brake rotor plate which is attached to the rear wheel axle and rotates therewith. Additionally, the caliper arm preferably pivots about an axis which extends in generally parallel relation to the axis of the rear wheel axle, or may alternatively pivot about an axis which is coaxially aligned with the axis of the rear wheel axle. In this respect, the caliper arm may be pivotally anchored directly to the rear wheel axle and pivot about its axis. Importantly, the amount of braking force/energy absorbed by the rear wheel suspension mechanism may be modified by adjusting the location(s) of the pivot point(s) of the braking system 12 (e.g., the pivot point location of the caliper arm relative to the axis of the rear wheel axle) and the relative angles of the components thereof.

The rear wheel suspension mechanism itself preferably comprises an upper link which is pivotally connected to the bicycle frame. In addition to the upper link, the rear wheel suspension mechanism includes a pair of seat stay members, the upper ends of which are pivotally connected to the upper link. Attached to the lower ends of respective ones of the seat stay members is a pair of rear wheel carrying members for receiving the rear wheel axle. The caliper arm of the braking system is itself pivotally connected to one of the rear wheel carrying members. Pivotally connected to the bicycle frame are the front ends of a pair of chain stay members, the back of ends of which are pivotally connected to respective ones of the rear wheel carrying members. The second end of the connector link is itself pivotally connected to one of the chain stay members. The rear wheel suspension mechanism further comprises a shock absorber having a first end which is connected to the seat stay members, and a second end which is connected to the upper link. The pivotal movement of the caliper arm facilitates the transfer of the braking force to the rear wheel suspension mechanism, and in particular to the shock absorber thereof. In this respect, the braking force is converted to a compressive force which acts on the shock absorber and facilitates the compression of the same, which has the effect of partially, fully, or over compensating for shock absorber unloading attributable to rear brake induced dive of the bicycle. Such compensation is achieved by the absorption of the braking force facilitated by the compression of the shock absorber.

In the present invention, the rear wheel suspension mechanism further comprises a shock support which is attached to and extends between the seat stay members, with the first end of the shock absorber being connected to the shock support. The shock absorber itself comprises an upper retaining plate which is attached to the upper link, and a lower retaining plate which is attached to the shock support extending between the seat stay members. Firmly seated between the upper and lower retaining plates is a springing member which is preferably fabricated from an elastomeric material. The springing member is compressed between the upper and lower retaining plates to provide a pre-load thereto, with the pivotal movement of the caliper arm facilitating the compression thereof. The shock absorber may also comprise a coil-spring/damper which is pivotally mounted to and extends between the upper link and the shock support. Also included in the rear wheel suspension mechanism is a pull link receiving tab which is attached to one of the chain stay members, with the second end of the pull link being pivotally connected to the pull link receiving tab.

The bicycle frame included in the braking system of the present invention preferably comprises a head tube disposed at the front end thereof, and an elongate seat tube disposed at the back end thereof. Rigidly attached to respective ones of the head and seat tubes are the opposed ends of an elongate top tube or cross bar. The rear wheel suspension mechanism, and in particular the upper link and front ends of the chain stay members, are preferably connected to the seat tube of the bicycle frame.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
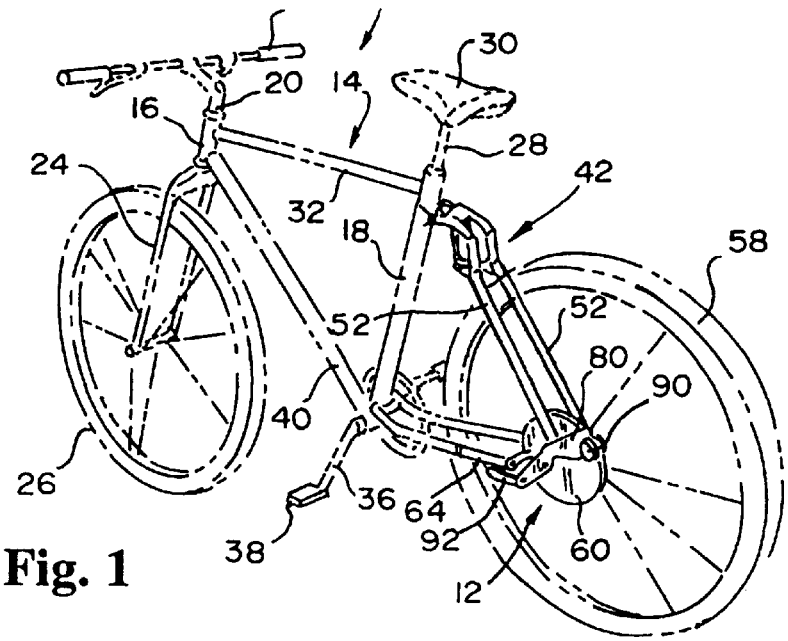
FIG. 1 is a rear perspective view of a bicycle incorporating the anti-dive braking system constructed in accordance with the present invention.

Referring now to the drawings wherein the showings are for purposes of illustrating a preferred embodiment of the present invention only, and not for purposes of limiting the same, FIG. 1 perspectively illustrates a bicycle 10 incorporating the anti-dive braking system 12 constructed in accordance with the present invention. The bicycle 10 comprises a bicycle frame 14 including a head tube 16 disposed at the front end of the bicycle 10 and an elongate seat tube 18 disposed toward the back end of the bicycle 10. Connected to the head tube 16 is a stem 20 having the handle bars 22 attached to the top end thereof. Attached to the bottom end of the stem 20 is a front fork assembly 24. Rotatably connected to the front fork assembly 24 is the axle of the front wheel 26. In accordance with known bicycle designs, the front fork assembly 24 may be provided with shock absorbing capability. Telescopically received into the top end of the seat tube 18 is a seat post 28 having a saddle or seat 30 connected to the top end thereof.

The bicycle frame 14 further comprises an elongate cross bar or top tube 32 having opposed ends which are rigidly attached to respective ones of the head and seat tubes 16, 18. Rigidly attached to the bottom end of the seat tube 18 is a cylindrically configured axle receiving bracket 34 having a bore extending axially therethrough. The bore of the axle receiving bracket 34 is adapted to receive a bottom bracket axle of the bicycle 10 which includes a pair of cranks 36 attached to respective ones of the opposed end thereof. Rotatably connected to the distal ends of the cranks 36 are the pedals 38. Additionally, attached to one end of the bottom bracket axle between the axle receiving bracket 34 and a crank 36 is a chain wheel which is adapted to rotate concurrently with the bottom bracket axle. Rigidly attached to and extending between the head tube 16 and the axle receiving bracket 34 is an elongate down tube 40. The head, seat, top and down tubes 16, 18, 32, 40 each typically have generally cylindrical configurations, and are secured to one another via welded or brazed connections.

Figure 2:
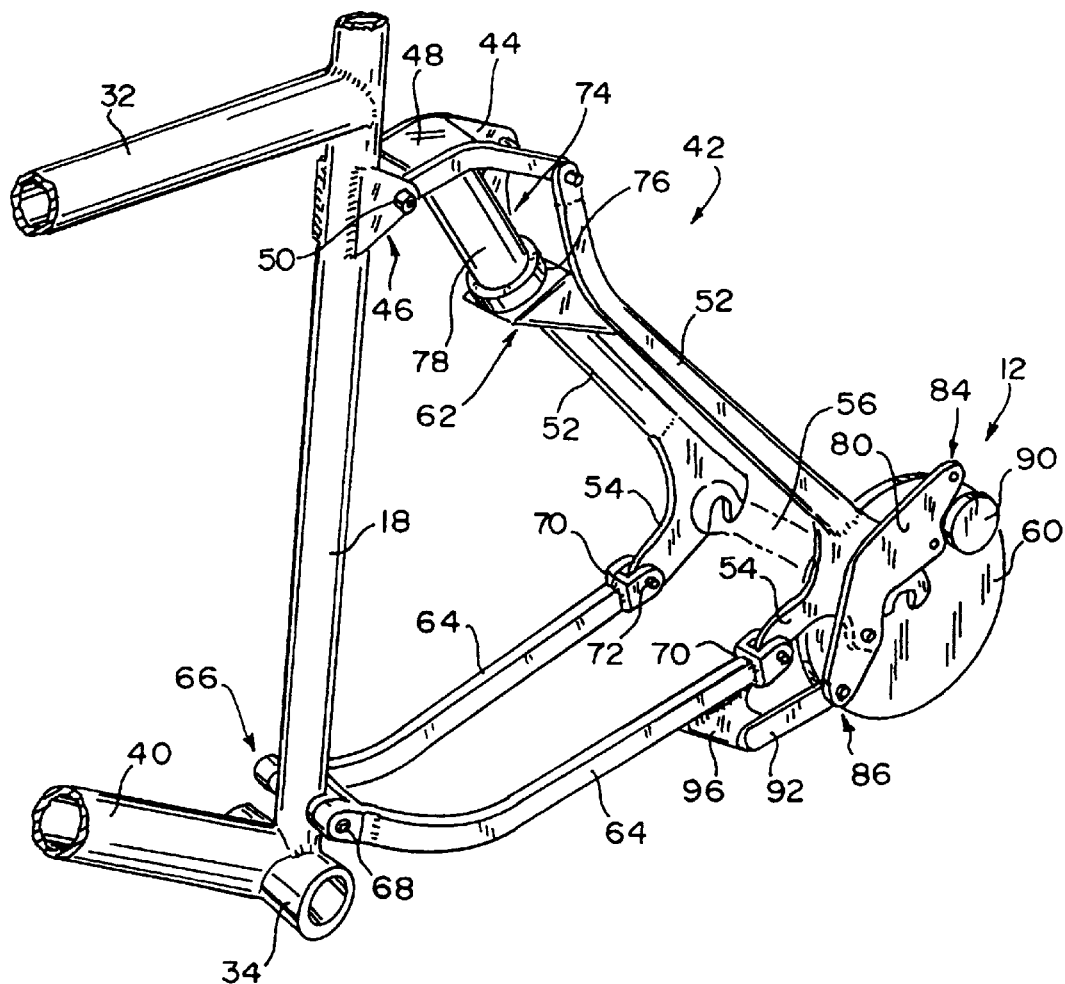
FIG. 2 is a front perspective view of the rear wheel suspension mechanism of the bicycle incorporating the braking system of the present invention.

Referring now to FIGS. 1 and 2, connected to the bicycle frame 14, and more particularly to the seat tube 18 thereof, is a rear wheel suspension mechanism 42. The rear wheel suspension mechanism 42 comprises an upper link 44 which is pivotally connected to the seat tube 18 via a link bracket 46. The link bracket 46 is rigidly attached to the back of the seat tube 18, and defines a pair of triangularly configured flange portions which extend in opposed, spaced relation to each other. Disposed within the flange portions and extending laterally therethrough is a pair of coaxially aligned apertures. The attachment of the link bracket 46 to the seat tube 18 is preferably facilitated through a welding or brazing process.

The upper link 44 of the rear wheel suspension mechanism 42 has a generally H-shaped configuration, and includes front and back pairs of mounting ears which are separated by a generally planar central base portion 48. Disposed within the front pair of mounting ears and extending laterally therethrough is a pair of coaxially aligned apertures. The pivotal connection of the upper link 44 to the link bracket 46 is facilitated by initially inserting the front pair of mounting ears between the flange portions of the link bracket 46. In this respect, the distance separating the flange portions of the link bracket 46 from each other is adapted to slidably accommodate the front pair of mounting ears of the upper link 44 therebetween. When the front pair of mounting ears are properly positioned between the flange portions, the apertures disposed within the front pair of mounting ears are coaxially aligned with those disposed within the flange portions, with a fastener 50 being extended through the coaxially aligned apertures to facilitate the pivotal connection of the upper link 44 to the link bracket 46.

The rear wheel suspension mechanism 42 of the bicycle 10 further comprises a pair of identically configured seat stay members 52 having upper ends which are pivotally connected to the upper link 44 and more particularly to the back pair of mounting ears of the upper link 44. Rigidly attached to the lower ends of respective ones of the seat stay members 52 is a pair of rear wheel carrying members 54 which are adapted to receive the rear wheel axle 56 of the bicycle rear wheel 58. In the bicycle 10, the rear wheel axle 56 includes a circularly configured brake rotor plate 60 attached thereto and rotatable concurrently therewith. The brake rotor plate 60 defines generally planar inner and outer braking surfaces, and interacts with the braking system 12 in a manner which will be discussed in more detail below. Though not shown, also attached to the rear wheel axle 56 is a rear sprocket which is cooperatively engaged to the chain wheel of the bicycle 10 via a chain.

In the rear wheel suspension mechanism 42, the upper portions of the seat stay members 52 are arcuately contoured, and are bowed inwardly toward the seat tube 18 when pivotally connected to the upper link 44. Rigidly attached to and extending between the arcuately contoured portions of the seat stay members 52 is a shock support 62 which is also directed inwardly toward the seat tube 18. The shock support 62 includes a pair of triangularly configured leg portions which are rigidly attached to respective ones of the seat stay members 52 via a welding or brazing process. Extending between the leg portions of the shock support 62 is a generally planar middle portion.

In addition to the seat stay members 52, the rear wheel suspension mechanism 42 of the bicycle 10 includes a pair of chain stay members 64, the front ends of which are pivotally connected to the seat tube 18. The connection of the chain stay members 64 to the seat tube 18 is preferably facilitated by a chain stay end housing 66 which is rigidly attached to the front ends of the chain stay members 64 via a welding or brazing process and is pivotally connected to the seat tube 18 via a fastener 68. The back ends of the chain stay members 64 are themselves pivotally connected to respective ones of the rear wheel carrying members 54.

To facilitate such pivotal connection, rigidly attached to the back ends of respective ones of the chain stay members 64 is a pair of clevis members 70. The frontal portion of each rear wheel carrying member 54 is inserted into the space defined between the juxtaposed prong portions of a respective clevis member 70, with such prong portions being separated from each other by a distance sufficient to allow the frontal portion of the rear wheel carrying member 54 to be slidably inserted therebetween. The frontal portion of the rear wheel carrying member 54 is oriented within a respective clevis member 70 such that an aperture disposed therein is coaxially aligned with a pair of apertures extending laterally through the prong portions of the clevis member 70. Thereafter, a fastener 72 such as a pivot pin is extended through the coaxially aligned apertures of the prong portions and the frontal portion, thus pivotally connecting the rear wheel carrying member 54 to the clevis member 70, and hence a respective chain stay member 64.

In addition to the aforementioned components, the rear wheel suspension mechanism 42 of the bicycle 10 includes a shock absorber 74. The shock absorber 74 comprises an upper retaining plate (not shown) which is rigidly attached to the upper link 44, and more particularly to the lower surface of the base portion 48 thereof. The upper retaining plate defines a generally circular central portion having a peripheral flange portion extending angularly outward therefrom, thus giving the upper retaining plate a generally pan-like configuration. The upper retaining plate is oriented upon the lower surface of the base portion 48 such that its flange portion extends outwardly therefrom. In addition to the upper retaining plate, the shock absorber 74 includes a lower retaining plate 76 which is configured identically to the upper retaining plate, and is rigidly attached to the shock support 62, and more particularly the upper surface of the middle portion thereof. The lower retaining plate 76 is itself oriented upon the upper surface of the middle portion such that its flange portion extends outwardly therefrom.

In addition to the upper retaining plate and lower retaining plate 76, the shock absorber 74 further comprises an elongate, cylindrically configured dampening or springing member 78 which is preferably fabricated from an elastomeric material and is firmly seated between the upper retaining plate and lower retaining plate 76. The springing member 78 is preferably compressed between the upper and lower retaining plates to provide a pre-load thereto. Such compression is typically achieved by sizing the springing member 78 such that when the upper and lower retaining plates are positioned on the opposed ends thereof, the distance separating the outer surfaces of the central portions of the upper and lower retaining plates slightly exceeds the distance separating the lower surface of the base portion 48 from the upper surface of the middle portion of the shock support 62. As will be recognized, such relative sizing necessitates that the springing member 78 be slightly compressed to enable the upper and lower retaining plates to be inserted and properly oriented between the upper link 44 and shock support 62. However, the springing member 78 need not be compressed between the upper and lower retaining plates of the shock absorber 74, and may alternatively be mechanically fastened thereto.

Figures 4A, 4B:
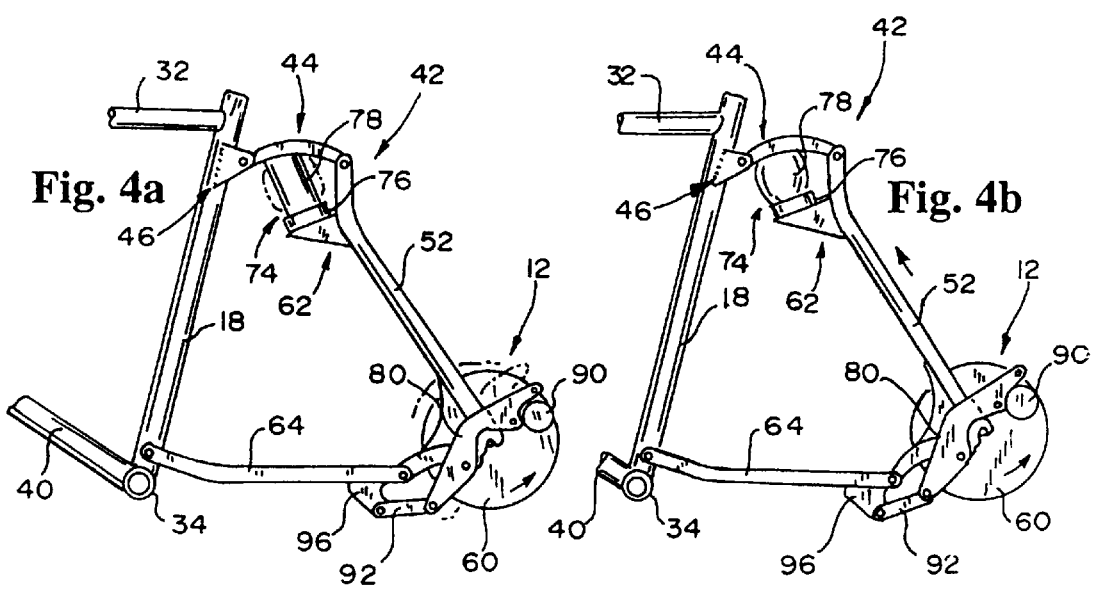
FIG. 4a is a side elevational view of the rear wheel suspension mechanism and braking system of the present invention as in an unactuated condition.
FIG. 4b is a side elevational view of the rear wheel suspension mechanism and braking system of the present invention as actuated thereby.

When the shock absorber 74 is in its normal, uncompressed state (as shown in FIG. 4a), the opposed ends of the springing member 78 are in contact with only the central portions of the upper and lower retaining plates, with gaps being defined between the outer surface of the springing member 78 and the flange portions of the upper and lower retaining plates. When a shock force is applied to the rear wheel 58 of the bicycle 10, the rear wheel carrying members 54 are moved upwardly, thus resulting in the upward planar motion of the seat stay members 52. The upward planar motion of the seat stay members 52 in turn causes the upper link 44 to be pivoted upwardly about the axis of the fastener 50. The upward pivotal motion of the upper link 44 concurrently with the planar motion of the seat stay members 52 facilitates the compression of the springing member 78 between the upper and lower retaining plates (as shown in FIG. 4b). In this respect, when the shock absorber 74 compresses, the "knee action" of the upper link 44 and seat stay members 52 compresses the springing member 78, with the upper and lower retaining plates moving about a common pivot in a scissor-like motion.

Due to the resilience of the springing member 78, the upper and lower retaining plates may be rigidly, rather than pivotally attached to the upper link 44 and shock support 62 since the opposed ends of the springing member 78 will conform to the motion of the upper and lower retaining plates. When the springing member 78 is compressed, the same is maintained between the upper and lower retaining plates by the flange portions thereof against which the end portions of the springing members 78 are abutted when the same is compressed. A more detailed discussion of the structure and functionality of the rear wheel suspension mechanism 42 is described in Applicant's U.S. Pat. No. 5,441,292 entitled BICYCLE REAR SUSPENSION SYSTEM issued Aug. 15, 1995, the disclosure of which is incorporated herein by reference.

Though not shown, it will be recognized that the shock absorber 74 may alternatively comprise a conventional coil-spring type shock absorber. If this type of shock absorber is employed in the rear wheel suspension mechanism 42, it will further be recognized that one or both of the opposed ends thereof will be pivotally connected to the upper link 44 and/or shock support 62.

Figure 3:
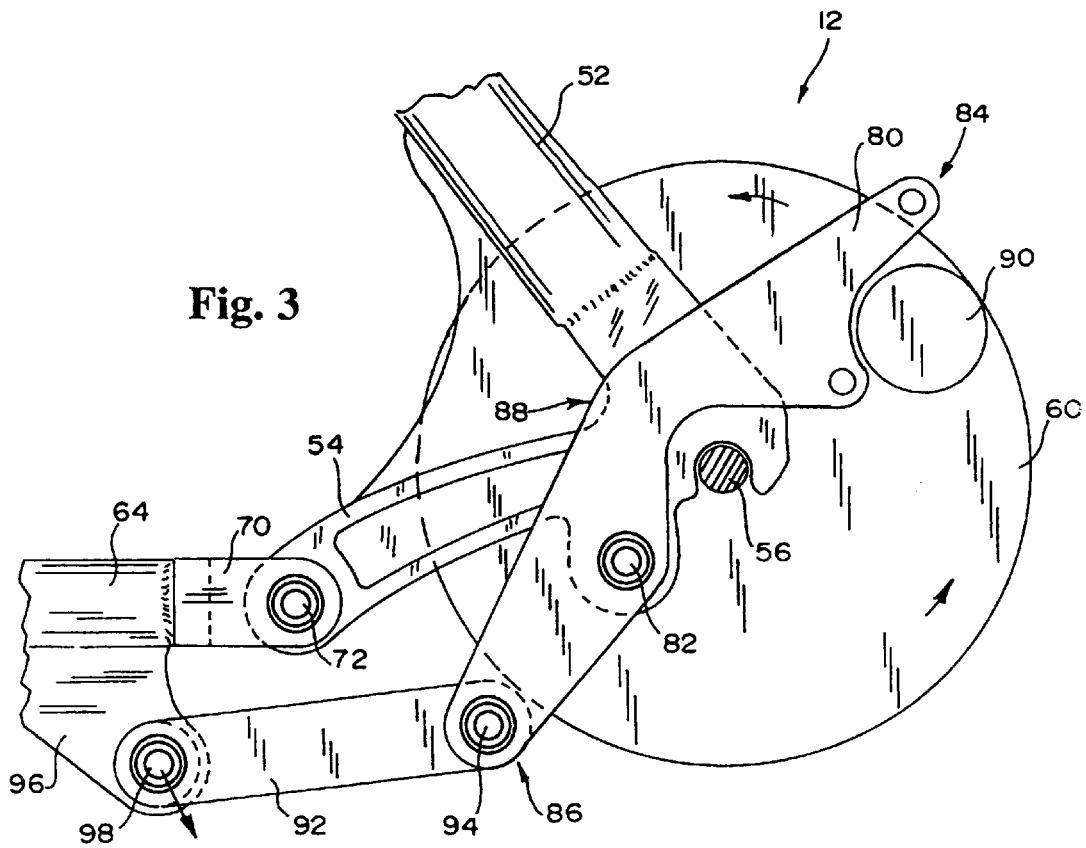
FIG. 3 is a partial side-elevational view of the braking system of the present invention.

Referring now to FIGS. 2 and 3, the braking system 12 of the bicycle 10 comprises a caliper arm 80 which is pivotally connected to one of the rear wheel carrying members 54 via a fastener 82 such as a pivot pin. In the braking system 12, the axis of the fastener 82 (i.e., the axis of the pivot point of the caliper arm 80) preferably extends in generally parallel relation to the axis of the rear wheel axle 56, with the axes of the fastener 82 and rear wheel axle 56 preferably being disposed in relative close proximity to each other. Importantly, the orientation of the axes of the fastener 82 and rear wheel axle 56 in close proximity to each other provides an anti-lock function to the braking system 12. Though not shown, the caliper arm 80 may be pivotally anchored directly to the rear wheel axle 56, thus causing the caliper arm 80 to pivot about the axis of the rear wheel axle 56. The advantages attendant to modifying the location of the pivot point of the caliper arm 80 relative to the axis of the rear wheel axle 56 will be discussed in more detail below.

As best seen in FIG. 3, the caliper arm 80 of the braking system 12 has a bent configuration, and defines an upper end 84, a lower end 86, and a reduced width central portion 88. In this respect, the pivot point of the caliper arm 80 as shown in FIG. 3 is located in the lower half thereof, between the central portion 88 and lower end 86. Attached to the upper end 84 of the caliper arm 80 is a conventional brake caliper 90. In the braking system 12, the brake caliper 90, when actuated, is adapted to engage the inner and outer braking surfaces defined by the brake rotor plate 60 attached to the rear wheel axle 56. As will be recognized, the actuation of the brake caliper 90 facilitates the application of a frictional force to the inner and outer braking surfaces of the brake rotor plate 60, thus slowing the rotation of the brake rotor plate 60, and hence the rear wheel 58.

In addition to the caliper arm 80 and brake caliper 90, the braking system 12 includes a pull link 92 having a first or back end which is pivotally connected to the lower end 86 of the caliper arm 80 via a fastener 94 such as a pivot pin. The pull link 92 further includes a second or front end which is pivotally connected to a pull link receiving tab 96 rigidly attached to one of the chain stay members 64 via a welding or brazing process. The pivotal connection of the pull link 92 to the pull link receiving tab 96 is facilitated by a fastener 98 such as a pivot pin. It will be recognized that the pull link receiving tab 96 is rigidly attached to that chain stay member 64 of the pair which is pivotally connected to the rear wheel carrying member 54 having the caliper arm 80 connected thereto.

Having thus described the components of the braking system 12, the functionality thereof will now be described with particular reference to FIGS. 3, 4a and 4b. When the bicycle 10 is being propelled in a forward direction, the brake rotor plate 60 attached to the rear wheel axle 56 of the rear wheel 58 rotates in a counter-clockwise direction as shown in FIG. 3. The actuation of the brake caliper 90 causes the same to engage the inner and outer braking surfaces defined by the brake rotor plate 60. Importantly, such engagement of the brake caliper 90 to the brake rotor plate 60 induces the counter-clockwise pivotal movement (i.e., rotation) of the caliper arm 80 about the axis defined by the fastener 82 (i.e., induces a positive moment on the caliper arm 80). As will be recognized, the positive moment on (counter-clockwise pivotal movement of) the caliper arm 80 is induced by the frictional force exerted on the actuated brake caliper 90 by the brake rotor plate 60 in combination with the pivotal mounting of the caliper arm 80 to the rear wheel carrying member 54 via the fastener 82. The frictional force is exerted upon the brake caliper 90 when the same engages the brake rotor plate 60. Such frictional force is a source of braking force which is transmitted to the caliper arm 80.

The pivotal connection of the front and back ends of the pull link 92 to the pull link receiving tab 96 and lower end 86 of the caliper arm 80, respectively, creates a counter-moment to the friction induced positive moment exerted upon the caliper arm 80. Associated with this counter-moment is a tensile force in the pull link 92 which in turn causes the braking force applied thereto to be transferred into the rear wheel suspension mechanism 42, and more particularly the seat stay members 52 thereof in the manner shown in FIG. 4b. Such force transmission through the seat stay members 52 results in the actuation of the rear wheel suspension mechanism 42, thus facilitating the compression of the shock absorber 74. Advantageously, the actuation of the rear wheel suspension mechanism 42 counters the unweighting or dive thereof normally resulting from the braking of the rear wheel 58. In this respect, the rear wheel suspension mechanism 42, and more particularly the shock absorber 74 thereof, absorbs the braking force transferred to the seat stay members 52 by the caliper arm 80, thus creating an anti-dive effect.

Figure 5:
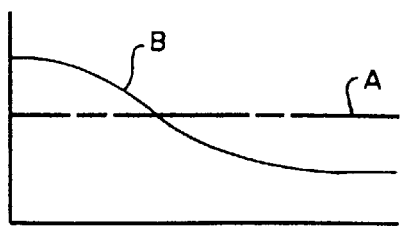
FIGS. 5–7 are graphs depicting the performance characteristics of the braking system of the present invention.

As shown by the line A in FIG. 5, in the braking system 12, the braking force applied to the rear wheel suspension mechanism 42 as a result of the braking of the rear wheel 58 in the aforementioned manner is substantially constant throughout the range of travel of the rear wheel suspension mechanism 42. Optimally, as shown by the line B in FIG. 5, it is desirable to have a high rear suspension compression force applied to the rear wheel suspension mechanism 42 at the initiation of the braking (at "top out"), with the application of such rear suspension compression force steadily decreasing through the travel of the rear wheel suspension mechanism 42 (until "bottom out"). A performance curve closer to that shown by line B can be accomplished in the braking system 12 by adjusting the location(s) of the pivot point(s) of the braking system 12 (e.g., the pivot point location of the caliper arm 80 (i.e., the axis of the fastener 82) relative to the axis of the rear wheel axle 56) and the relative angles of the caliper arm 80 and pull link 92. In this respect, the amount of braking force transferred to the rear wheel suspension mechanism 42 can be selectively increased or decreased by modifying the location of the caliper arm 80 pivot point, thus allowing the braking system 12 to be tuned to facilitate no dive at all or even a positive squat of the rear wheel suspension mechanism 42 during the braking of the bicycle 10.

Figure 6:
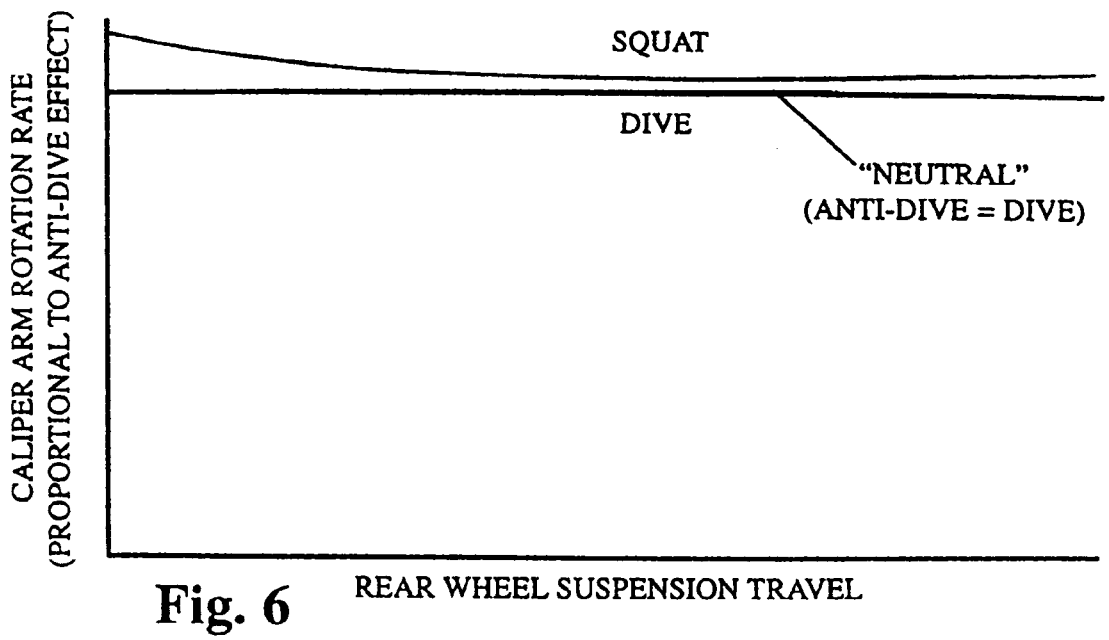
Figure 7:
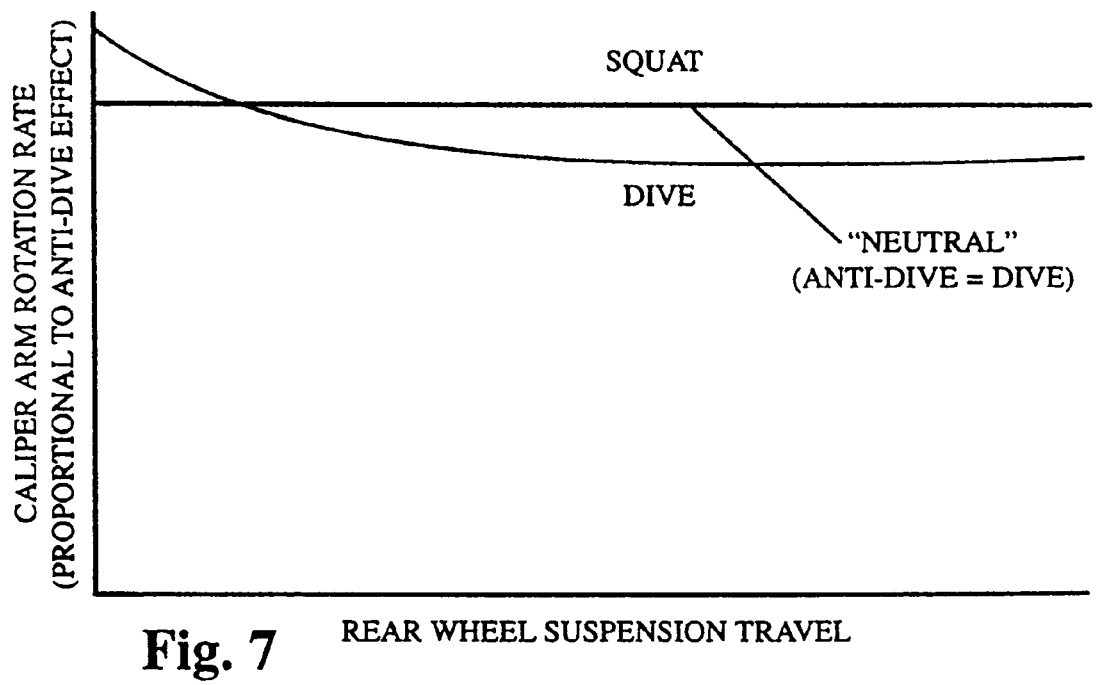

FIGS. 6 and 7 graphically illustrate the manner in which the braking system 12 of the present invention can be selectively "tuned". In this respect, the performance characteristics of the braking system 12 can be modified from that shown in FIG. 6 to that shown in FIG. 7 by moving the location of the pivot point of the caliper arm 80 (i.e., the location of the fastener 82) forward relative to the rear wheel carrying member 54 and shortening the length of the pull link 92. Such movement of the pivot point defined by the fastener 82 forward and shortening of the pull link 92 facilitates a "falling rate" effect in the braking system 12.

Those of ordinary skill in the art will recognize that the braking force/energy can be transferred to the rear wheel suspension mechanism 42 via the previously described mechanical linkage system, or alternatively through the utilization of a hydraulic system alone or in combination with a mechanical linkage system. Additionally, any such system or combination thereof can be adapted to constantly or variably amplify the braking force/energy as a function of the position of the rear wheel suspension mechanism 42. The transferred braking force/energy can also be applied to the rear wheel suspension system 42 in the aforementioned manner, or directly to the shock absorber 74 without first being transmitted through the seat stay members 52 of the rear wheel suspension mechanism 42.

Additional modifications and improvements of the present invention may also be apparent to those skilled in the art. Thus, the particular combination of parts described and illustrated herein is intended to represent only certain embodiments of the present invention, and is not intended to serve as limitations of alternative devices within the spirit and scope of the invention.

What is claimed is:

1. A bicycle braking system, comprising:
   a bicycle frame;
   at least one seat stay member having an upper end attached to the bicycle frame and a lower end;
   at least one rear wheel carrying member attached to the lower end of the seat stay member;
   at least one chain stay member having a front end attached to the bicycle frame an a back end attached to the rear wheel carrying member;
   a rear wheel having a braking surface and a rear wheel axle which defines an axis and is rotatably connected to the rear wheel carrying member;
   a caliper arm pivotally connected to the rear wheel carrying member;
   a brake caliper attached to the caliper arm and selectively engageable to the braking surface; and
   a pull link having a first end pivotally connected to the caliper arm and a second end pivotally connected to the chain stay member;
      wherein the engagement of the brake caliper to the braking surface during rotation of the rear wheel creates a braking force which induces the exertion of a moment upon the caliper arm and a tensile force upon the pull link resulting in the transmission of the braking force upwardly through the seat stay member.

2. The braking system of claim 1 further comprising a shock absorber mechanically coupled between the bicycle frame and the seat stay member and operative to absorb the braking force transmitted through the seat stay member.

3. The braking system of claim 2 wherein:
   the upper end of the seat stay member and the front end of the chain stay member are each pivotally connected to the bicycle frame;
   the lower end of the seat stay member is rigidly attached to the rear wheel carrying member; and
   the back end of the chain stay member is pivotally connected to the rear wheel carrying member.

4. The braking system of claim 3 wherein the bicycle frame comprises:
   a head tube disposed at the front of the bicycle frame;
   an elongate seat tube disposed at the back of the bicycle frame; and
   an elongate top tube having opposed ends rigidly attached to respective ones of the head and seat tubes;
   the upper end of the seat stay member and the front end of the chain stay member each being pivotally connected to the seat tube of the bicycle frame.

5. The braking system of claim 1 wherein the braking surface of the rear wheel is defined by a circularly configured brake rotor plate attached to the rear wheel axle and rotatable therewith.

6. The braking system of claim 1 wherein the caliper arm pivots about an axis which extends in generally parallel relation to the axis of the rear wheel.

7. The braking system of claim 1 further comprising a pull link receiving tab attached to the chain stay member, the second end of the pull link being pivotally connected to the pull link receiving tab.

8. The braking system of claim 1 wherein:
   the at least one seat stay member comprises a pair of seat stay members having upper ends pivotally connected to the bicycle frame and lower ends;
   the at least one rear wheel carrying member comprises a pair of rear wheel carrying members attached to the lower ends of respective ones of the seat stay members; and
   the at least one chain stay member comprises a pair of chain stay members having front ends pivotally connected to the bicycle frame and back ends attached to respective ones of the rear wheel carrying members;
   the caliper arm being pivotally connected to one of the rear wheel carrying members and the second end of the pull link being pivotally connected to one of the chain stay members.

9. A bicycle braking system, comprising:
   a bicycle frame;
   at least one seat stay member having an upper end attached to the bicycle frame and a lower end;
   at least one rear wheel carrying member attached to the lower end of the seat stay member;
   at least one chain stay member having a front end attached to the bicycle frame and a back end attached to the rear wheel carrying member;
   a rear wheel having a braking surface and a rear wheel axle which defines an axis and is rotatably connected to the rear wheel carrying member; and
   a braking assembly attached to the rear wheel carrying member and the chain stay member, the braking assembly being selectively engageable to the braking surface of the rear wheel, the braking assembly comprising:
      a) a caliper arm pivotally connected to the rear wheel carrying member;
      b) a brake caliper attached to the caliper arm and selectively engageable to the braking surface; and
      c) a pull link having a first end pivotally connected to the caliper arm and a second end pivotally connected to the chain stay member;
         the configuration of the braking assembly and attachment thereof to the chain stay member causing a braking force created by the engagement of the braking assembly to the braking surface during rotation of the rear wheel wherein the braking force induces the exertion of a moment upon the caliper arm and a tensile force upon the pull link resulting in the transmission of the braking force upwardly through the seat stay member in a manner countering the unweighting of the rear wheel normally resulting from the braking of the bicycle.

10. The braking system of claim 9 wherein the caliper arm pivots about an axis which extends in generally parallel relation to the axis of the rear wheel axle.

* * * * *